United States Patent
Kang et al.

(10) Patent No.: US 10,215,112 B1
(45) Date of Patent: Feb. 26, 2019

(54) METHOD AND SYSTEM FOR CONTROLLING AN INTERNAL COMBUSTION ENGINE

(71) Applicant: GM GLOBAL TECHNOLOGY OPERATIONS LLC, Detroit, MI (US)

(72) Inventors: Jun-mo Kang, An Arbor, MI (US); Hejie Lin, Troy, MI (US); Jeffrey A. Morgan, Macomb, MI (US)

(*) Notice: Subject to any disclaimer, the term of this patent is extended or adjusted under 35 U.S.C. 154(b) by 0 days.

(21) Appl. No.: 15/699,135

(22) Filed: Sep. 8, 2017

(51) Int. Cl.
| | |
|---|---|
| F02D 35/00 | (2006.01) |
| F02D 35/02 | (2006.01) |
| F02D 41/00 | (2006.01) |
| G01M 15/04 | (2006.01) |
| F02P 5/153 | (2006.01) |
| G01M 15/08 | (2006.01) |
| F02D 41/40 | (2006.01) |

(52) U.S. Cl.
CPC ....... F02D 35/023 (2013.01); F02D 41/0085 (2013.01); F02D 41/401 (2013.01); F02P 5/153 (2013.01); G01M 15/042 (2013.01); G01M 15/08 (2013.01)

(58) Field of Classification Search
CPC .. F02D 35/023; F02D 41/0085; F02D 41/401; F02D 35/028; G01M 15/08
See application file for complete search history.

(56) References Cited

U.S. PATENT DOCUMENTS

| | | | | |
|---|---|---|---|---|
| 5,687,082 A | * | 11/1997 | Rizzoni | F02P 17/12 324/379 |
| 9,803,580 B2 | * | 10/2017 | Yun | F02P 5/045 |
| 2002/0144672 A1 | * | 10/2002 | Hosoya | F02D 35/023 123/406.27 |
| 2003/0010101 A1 | * | 1/2003 | Zur Loye | F02D 35/023 73/114.05 |
| 2004/0084024 A1 | * | 5/2004 | Malaczynski | F02D 35/021 123/435 |
| 2005/0247285 A1 | * | 11/2005 | Nagai | F02D 35/023 123/305 |
| 2006/0074543 A1 | * | 4/2006 | Rossignol | F02D 41/1498 701/111 |
| 2006/0225710 A1 | * | 10/2006 | Taglialatela-Scafati | F02D 35/023 123/486 |
| 2007/0119417 A1 | * | 5/2007 | Eng | F01L 1/34 123/305 |
| 2009/0266336 A1 | * | 10/2009 | Morimoto | F02D 35/023 123/406.47 |
| 2011/0118953 A1 | * | 5/2011 | Duval | F02D 35/023 701/102 |

(Continued)

*Primary Examiner* — Thomas Moulis

(57) ABSTRACT

A method for controlling an internal combustion engine that includes sensing a characteristic of combustion in a cylinder of the engine, generating a combustion characteristic signal from the sensed characteristic, performing a principal component analysis on the combustion characteristic signal and a predetermined combustion characteristic trace to determine first mode coefficients for the combustion characteristic signal and the predetermined combustion characteristic trace, determining a difference between the first mode coefficient of the combustion characteristic signal and the first mode coefficient of the predetermined combustion characteristic trace, and controlling the internal combustion engine based upon the difference.

20 Claims, 6 Drawing Sheets

(56) References Cited

U.S. PATENT DOCUMENTS

| | | | |
|---|---|---|---|
| 2011/0173957 A1* | 7/2011 | Funk | F01N 3/2033 |
| | | | 60/285 |
| 2011/0265773 A1* | 11/2011 | Xu | C10L 1/08 |
| | | | 123/703 |
| 2012/0103304 A1* | 5/2012 | Kang | F02D 35/023 |
| | | | 123/305 |
| 2013/0024087 A1* | 1/2013 | Duval | F02D 35/02 |
| | | | 701/102 |
| 2013/0340716 A1* | 12/2013 | Choi | F02M 51/06 |
| | | | 123/478 |
| 2014/0053811 A1* | 2/2014 | De Ojeda | F02D 41/00 |
| | | | 123/435 |
| 2014/0109873 A1* | 4/2014 | Allezy | F02D 41/0047 |
| | | | 123/435 |
| 2015/0377166 A1* | 12/2015 | Yasuda | F02D 41/0002 |
| | | | 123/406.41 |
| 2016/0017834 A1* | 1/2016 | Yun | F02P 5/045 |
| | | | 123/406.47 |
| 2016/0108843 A1* | 4/2016 | Han | F02D 41/0085 |
| | | | 701/103 |
| 2016/0208731 A1* | 7/2016 | Onder | F02D 41/3047 |
| 2016/0230689 A1* | 8/2016 | Yamashita | F02D 41/247 |
| 2016/0237923 A1* | 8/2016 | Kitagawa | F02D 35/023 |
| 2016/0258367 A1* | 9/2016 | Rauscher | F02D 35/024 |
| 2016/0369727 A1* | 12/2016 | Kitagawa | F02D 41/30 |
| 2017/0037791 A1* | 2/2017 | Kitagawa | F02D 35/023 |
| 2018/0058415 A1* | 3/2018 | Lin | F02P 5/153 |

\* cited by examiner

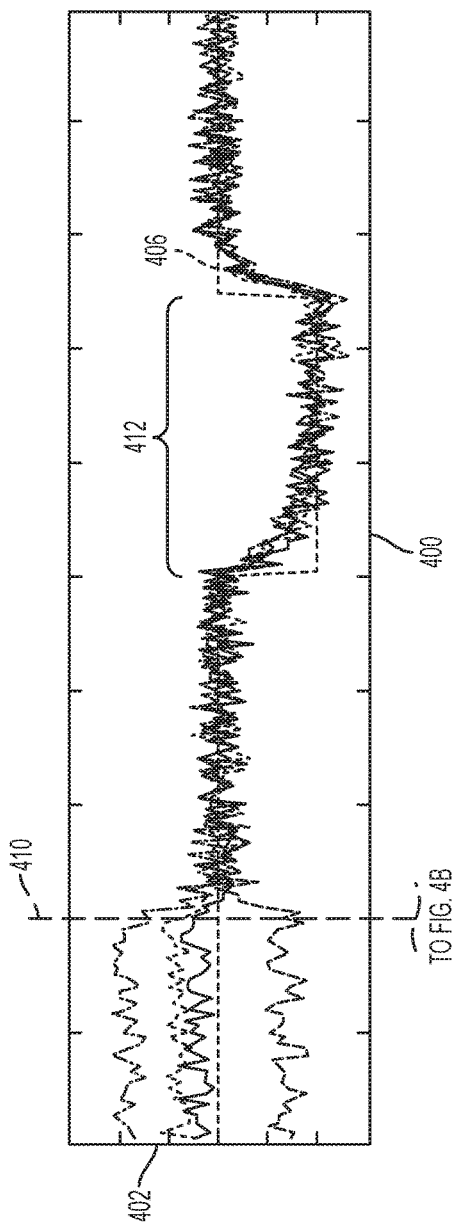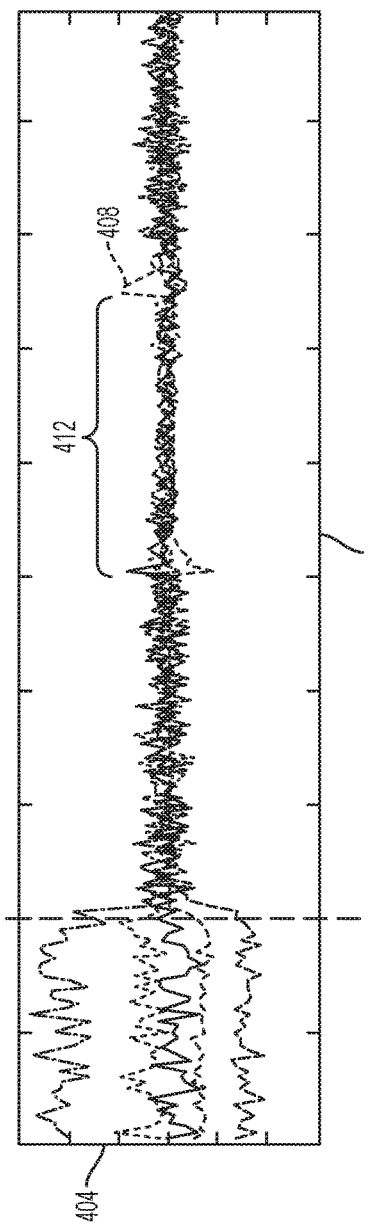
FIG. 4A
FIG. 4B

METHOD AND SYSTEM FOR CONTROLLING AN INTERNAL COMBUSTION ENGINE

FIELD

The present disclosure relates to a method and system for controlling an internal combustion engine.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Combustion phasing, or the time in an engine cycle when combustion in a cylinder occurs, affects the torque that is produced from the cylinder. Combustion phasing of a cylinder may be characterized by a crank angle at which the cylinder burns 50 percent of the fuel in the cylinder, which may be referred to as crank angle 50 (CA50). Engine controls systems may control the CA50 of a cylinder of an engine such that each cylinder produces its peak torque, and thereby improve fuel efficiency, economy, and performance.

Further, controlling each cylinder in a manner such that combustion achieves an optimum CA50 may improve engine balancing. Engine control systems may balance the engine by adjusting the spark timing of the cylinders to minimize a difference of CA50 between cylinders in the engine. Engine control systems may estimate the CA50 of a cylinder by measuring the pressure in the cylinder during an engine cycle and determining the total amount of heat released due to combustion in the cylinder during the engine cycle based on the measured cylinder pressure. The CA50 of a cylinder may be approximately equal to a crank angle at which 50 percent of the total amount of heat is released. Thus, engine control systems may determine the crank angle at which 50 percent of the total amount of heat is released based on the total amount of heat released and a rate of heat release, and set the CA50 equal to the determined crank angle.

Estimating the CA50 of each cylinder of an engine in the manner described above requires a pressure sensor in each cylinder and involves a large computational burden, which can lead to a poor response time when controlling the CA50 of each cylinder. This poor response time decreases the effectiveness of the CA50 control, which can lead to decrease fuel efficiency, reduced performance, and degrade vehicle durability and drivability.

Additionally, to estimate the CA50 of a cylinder the pressure trace signal must be differentiated. However, differentiation is highly susceptible to noise. Noise that is present within the pressure trace signal is amplified when that signal is differentiated which leads to inaccuracy in CA50 estimation. To minimize or avoid the adverse effects of noise, a pressure trace signal may need to be filtered to remove or minimize the noise. This filtering only adds to the computational burden.

Calculation of and/or estimation of CA50 is computationally intensive. The filtering, differentiation, and estimation of each cylinder requires a high amount of computations which may be expensive and susceptible to noise error.

SUMMARY

In an exemplary aspect, a method for controlling an internal combustion engine that includes sensing a characteristic of combustion in a cylinder of the engine, generating a combustion characteristic signal from the sensed characteristic, performing a principal component analysis on the combustion characteristic signal and a predetermined combustion characteristic trace to determine first mode coefficients for the combustion characteristic signal and the predetermined combustion characteristic trace, determining a difference between the first mode coefficient of the combustion characteristic signal and the first mode coefficient of the predetermined combustion characteristic trace, and controlling the internal combustion engine based upon the difference.

In another exemplary aspect, the combustion characteristic signal is a cylinder pressure signal from a pressure sensor of the cylinder.

In another exemplary aspect, the predetermined combustion characteristic trace is a predetermined cylinder pressure trace.

In another exemplary aspect, the combustion characteristic signal is a gap resistance signal from a spark plug of the cylinder.

In another exemplary aspect, the predetermined combustion characteristic trace is a predetermined gap resistance trace.

In another exemplary aspect, the predetermined combustion characteristic trace corresponds to a predetermined CA50 for the cylinder.

In another exemplary aspect, controlling the internal combustion engine is done by adjusting a spark timing signal based upon the difference.

In another exemplary aspect, controlling the internal combustion engine is done by adjusting a fuel injection timing signal based upon the difference.

In this manner, fuel economy, efficiency, performance, drivability, and durability may be improved by controlling combustion in an internal combustion engine, and providing the option to balance combustion in multiple cylinders in an engine, while significantly reducing the computational workload which results in significant cost savings of the equipment required to obtain these benefits and while also improving the responsiveness of the method and systems providing these advantages. Further, in contrast, with conventional methods and systems direct calculation of CA50 is completely obviated.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 4A is a graph of CA50 values for each cylinder of a multi-cylinder engine;

FIG. 4B is a graph of first mode coefficient values for each cylinder of a multi-cylinder engine.

DETAILED DESCRIPTION

Figure 1:
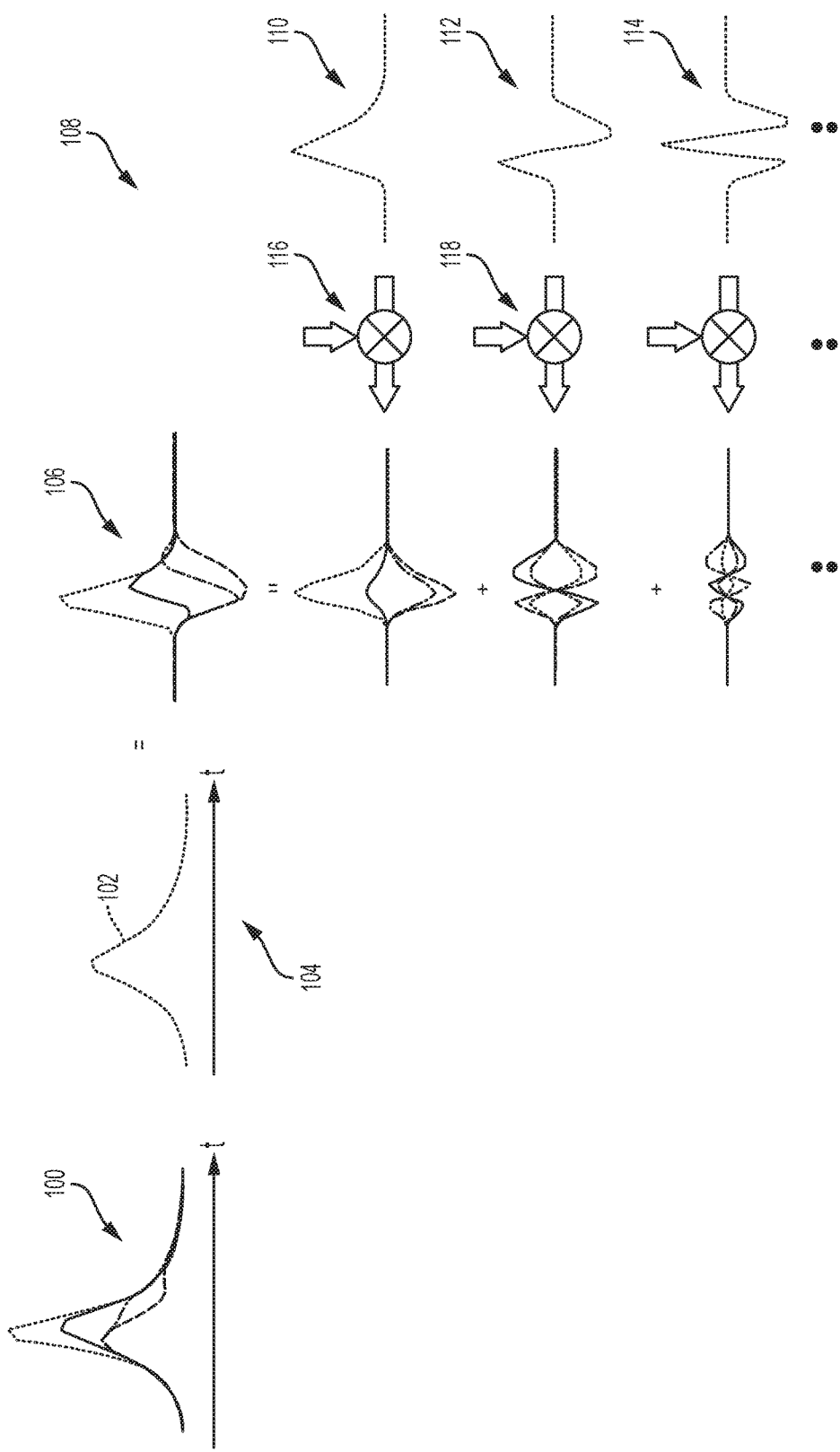
FIG. 1 is a schematic illustration of principal component analysis for an internal combustion engine.

The inventors discovered that there is a strong correlation between the first modal coefficients of a combustion characteristic signal from engine cylinders in an internal combustion engine and the CA50 of combustions occurring in those cylinders when combustions are not balanced. As a result of this discovery, the inventors have developed a method and system for controlling an internal combustion engine in which a principal component analysis may be substituted for a CA50 analysis and obtain similar, if not identical or better, improvements in fuel economy, fuel efficiency, and performance. The present disclosure provides these significant advantages without suffering the downsides of having to perform a CA50 analysis thereby avoiding the significant, computationally intensive workload and sensitivity to noise of a CA50 analysis. Further, the reduction in computational workload of a principal component analysis provides the additional benefit of improving the responsiveness over the control of the engine in response to disturbances which leads to even further improvements in fuel efficiency, economy, drivability, and performance.

Co-assigned, and co-pending U.S. patent application Ser. No. 15/252,322, the disclosure of which is incorporate herein in its entirety, describes a system and method for determining CA50 for a cylinder and then balancing the cylinders based upon that determination in a vehicle engine. In that disclosure the computational workload for CA50 for balancing the engine is reduced in comparison to convention engine balancing methods and systems. Rather than computing the CA50 for each and every cylinder in an engine and then balancing those cylinders, the CA50 for only one of the cylinders is calculated and the remaining cylinders are balanced based upon the CA50 calculation from that one cylinder. In this manner, for example in a four cylinder engine the computational workload may be reduced by approximately 75%. However, even though the computational workload may be reduced from calculating the CA50 from all the cylinders to only one, the computational workload from calculating that CA50 from that one cylinder remains significant.

By way of comparison, the inventors here disclose a method and system to control combustion in an internal combustion engine based upon principal component analysis of combustion characteristic signal that are sensed during operation and then compare the results to a principal component analysis of predetermined combustion characteristic signal that may, for example, correspond to an engine operating at a desired CA50, fuel efficiency, economy, performance, and/or the like without limitation.

The combustion characteristic signal may be a cylinder pressure trace, an ion sensor trace, spark plug gap resistance trace (same thing as an ion sensor trace?), or other sensed combustion characteristic without limitation.

An exemplary embodiment of the present disclosure performs a principal component analysis on a combustion characteristic signal and a predetermined combustion characteristic signal to determine first modal coefficients. A principal component analysis is a statistical procedure that uses orthogonal transformation to convert a set of observations of values into a set of linearly uncorrelated variables called principal components. Given a set of observations of possibly correlated signals, the most significant common mode (first principal mode) and its contribution to the individual signals (first modal coefficient) can be obtained through principal component analysis. The exemplary embodiment then compares the first mode coefficients and controls the engine based upon the results of that comparison.

While the principal component analysis decouples the signals being analyzed into multiple harmonics or component modes, only the dominant harmonic is significant. Thus, preferably, only the coefficients for the first component mode or first harmonic are determined and compared. Controlling the combustion such that the first mode coefficients match results in the successive harmonics and corresponding coefficients also matching. This is also advantageous in that any potential increased sensitivity of the succeeding/non-primary harmonics to noise has no adverse effect.

The predetermined combustion characteristic signal may be determined by conventional calibration techniques which operate an engine at a selection of loads and/or speeds to determine a combustion characteristic signal for each of those selections which provide a desired and/or optimized fuel efficiency, economy, performance, CA50, and/or the like without limitation. The combustion characteristic may correspond to a cylinder pressure trace, cylinder temperature, cylinder mixture, humidity, and/or the like without limitation.

By performing a principal component analysis on a sensed combustion characteristic signal and a predetermined combustion characteristic signal, then by controlling combustion such that the first mode coefficients of these signals match, in essence, the effect is to control the combustion such that the two signal traces substantially match in shape. In other words, the control system and method of the present disclosure adjusts combustion such that the actual combustion signal matches the shape of the predetermined combustion characteristic signal.

In an exemplary embodiment, the method or control system controls the engine based upon the first mode coefficient comparison by modifying, for example, the spark timing of each cylinder, the fuel injection timing, the valve timing, or any other controllable aspect which may affect combustion without limitation.

FIG. 1 schematically illustrates a principal component analysis for an internal combustion engine having multiple cylinders. A first graph 100 illustrates individual pressure traces from four cylinders in an internal combustion engine. In an exemplary embodiment, these four cylinder pressure traces may be averaged to arrive at an average cylinder pressure trace 102 as shown in second graph 104. The differences for each of the individual pressure traces (from graph 100) from the average cylinder pressure trace 102 may be determined as represented by third graph 106. Next a principal component analysis 108 is performed on each cylinder pressure difference to identify a first principal mode 110, a second principal mode 112, a third principal mode 114, and so on. The first mode coefficient 116 for each cylinder pressure difference may then be identified. The principal component analysis may also identify additional mode coefficients 118. However, the significance of each succeeding mode coefficient decreases. Using this type of analysis, exemplary embodiments of the present disclosure may improve the fuel efficiency, economy, and performance of an internal combustion engine.

Figure 2A:
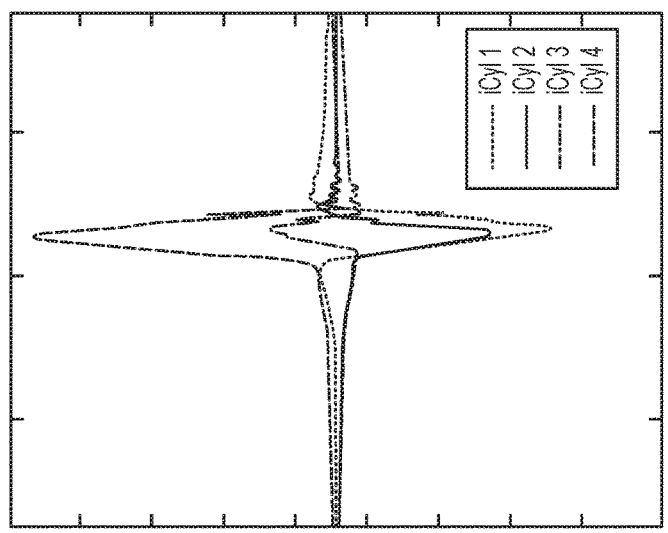
FIG. 2A is a graph illustrating cylinder pressure signals from each cylinder in a multi-cylinder engine.
Figure 2B:
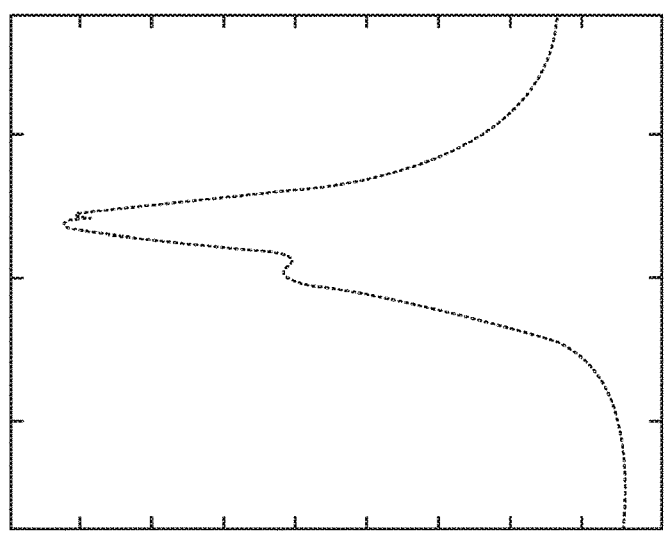
FIG. 2B is a graph illustrating an ensemble average of the cylinder pressure signals from FIG. 2A.
Figure 2C:
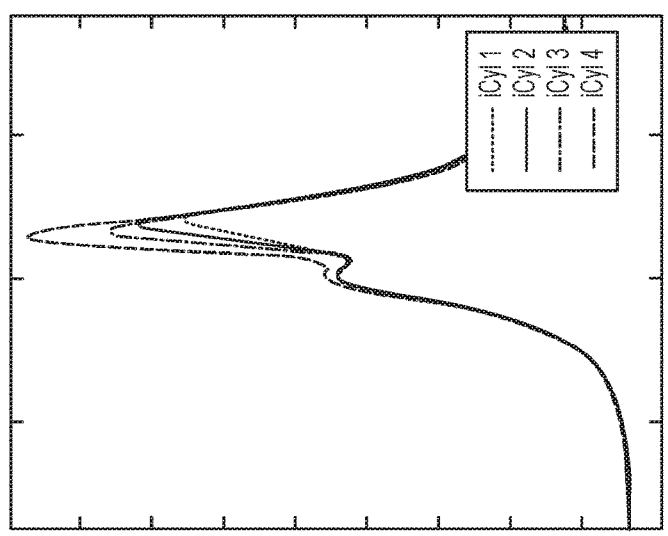
FIG. 2C is a graph illustrating the difference between cylinder pressure signals of each cylinder and the ensemble average.

FIGS. 2A-2F include graphs of signal traces that illustrate the correlation between CA50 and the coefficient of the first principle component mode for an engine having four cylinders. Based upon the relationship demonstrated in these figures, and discovered by the inventors of the present disclosure, combustion can be efficiently managed. FIG. 2A illustrates cylinder pressure signal traces from each of four cylinders in an internal combustion engine as each corresponding cylinder transitions through crankshaft angles surrounding top dead center as combustion occurs. These cylinder pressure signals may be represented as: $\{p(t,n)\}$. FIG. 2B illustrates the ensemble average across all four cylinder pressure signal traces. The ensemble average may be represented as: $\{\mu(t)\}$. FIG. 2C illustrates the differences between each cylinder pressure signal trace (of FIG. 2A) and the ensemble average across all four cylinder pressure signal traces (of FIG. 2B). The differential pressures in FIG. 2C may be represented as: $\{\delta(t,n)\}$. The relationship between these traces may be represented as:

$$\{p(t,n)\}=\{\mu(t)\}+\{\delta(t,n)\}$$

Where t is time (or degree) and n is the cylinder number. The differential pressures $\{\delta(t,n)\}$ are dependent (i.e. coupled) because the covariant matrix has non-zero off-diagonal elements. The covariance matrix may be represented as:

$$\left[\frac{\delta(t_i, n)\delta^T(t_j, n)}{n-1}\right]$$

The differential pressures $\{\delta(t,n)\}$ may be decomposed into a linear superposition of orthogonal Principal Component Modes PCMs $[\phi]$ as:

$$\{\delta(t,n)\}=[\phi(t,m)]\{\eta(m,n)\}$$

Where m is the mode number. Then the modal coefficient $\{\eta(m,n)\}$ of the PCMs $[\phi(t,m)]$ may be determined as:

$$\{\eta(m,n)\}=[\phi^{-1}]\{x\delta(t,n)\}=[\phi^T]\{\delta(t,n)\}$$

Where orthogonal PCMs $[\phi(t,m)]$ are the eigenvectors of covariance matrix of differential pressure $[\delta(t,n)]$:

$$\left[\frac{\delta(t_i, n)\delta^T(t_j, n)}{n-1}\right][\phi]=[\phi][\lambda(m)]$$

Where $[\lambda(m)]$ is a diagonal matrix of Eigenvalues.

Figure 2F:
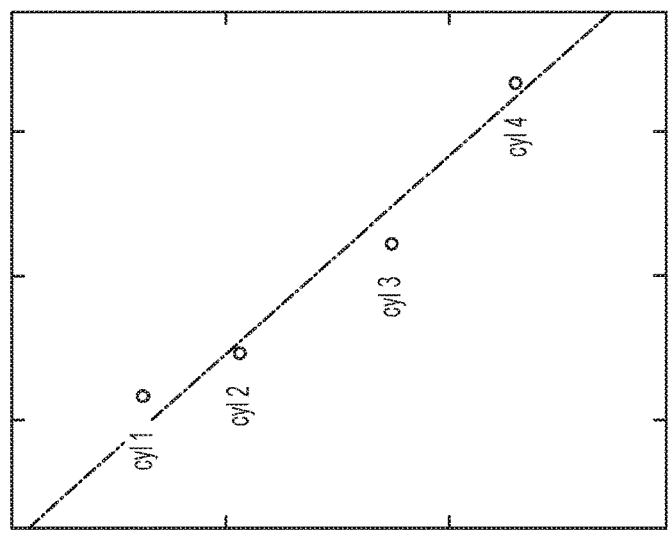
FIG. 2F is a graph illustrating the correlation between the first mode coefficients of each cylinder and the CA50 for each corresponding cylinder.
Figure 2E:
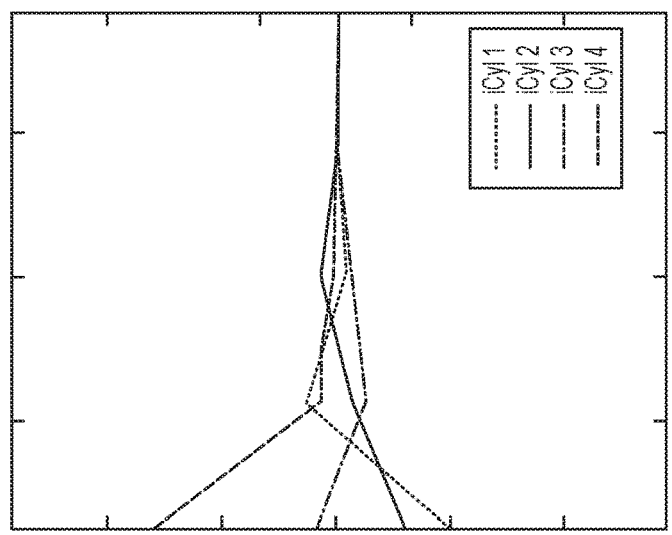
FIG. 2E is a graph illustrating the coefficients for the first five modes for each cylinder.
Figure 2D:
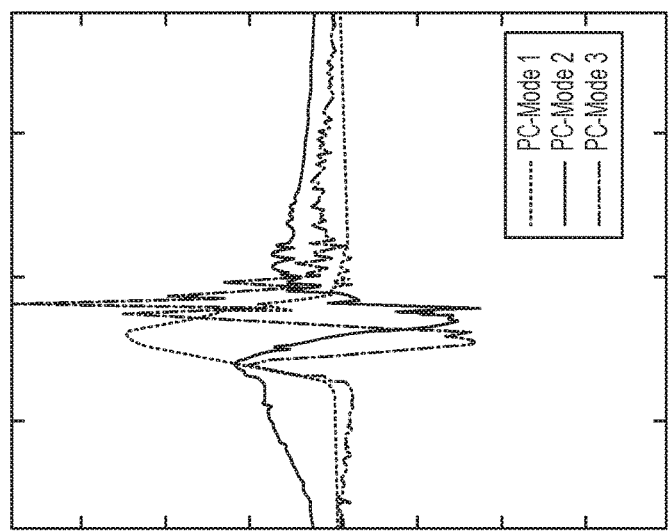
FIG. 2D is a graph illustrating principal components modes obtained in accordance with an exemplary embodiment of the present invention.

FIG. 2D illustrates a graph of the principal component modes obtained in accordance with the present disclosure. FIG. 2E illustrates a graph of the coefficients of the first five modes from the principal component analysis. The modes coefficients changing from the first mode on the left side of the graph to successive modes as we move to the right in the graph. Clearly, the first mode coefficients are larger and, thus, more significant than the succeeding modes. FIG. 2F is a graph illustrating the correlation between the first mode coefficients from the principal component analysis from each of the four cylinders and the CA50 for each cylinder. The horizontal axis of FIG. 2F represents the value of the first mode coefficient while the vertical axis represents the crank angle degree for a corresponding CA50. It is easily observed on FIG. 2F that the first mode coefficient falls along a line. Therefore, there is a linear relationship between the first mode coefficient and CA50. This relationship may be represented by:

$$\text{Constant} = \frac{\Delta(CA50)}{\Delta(PC-\text{First Mode Coefficient})}$$

Where Constant represents the slope of the line in FIG. 2F, $\Delta(CA50)$ is the change in CA50 and $\Delta(PC-\text{First Mode Coefficient})$ is the change in the first mode coefficient of the principal component.

Figure 3:
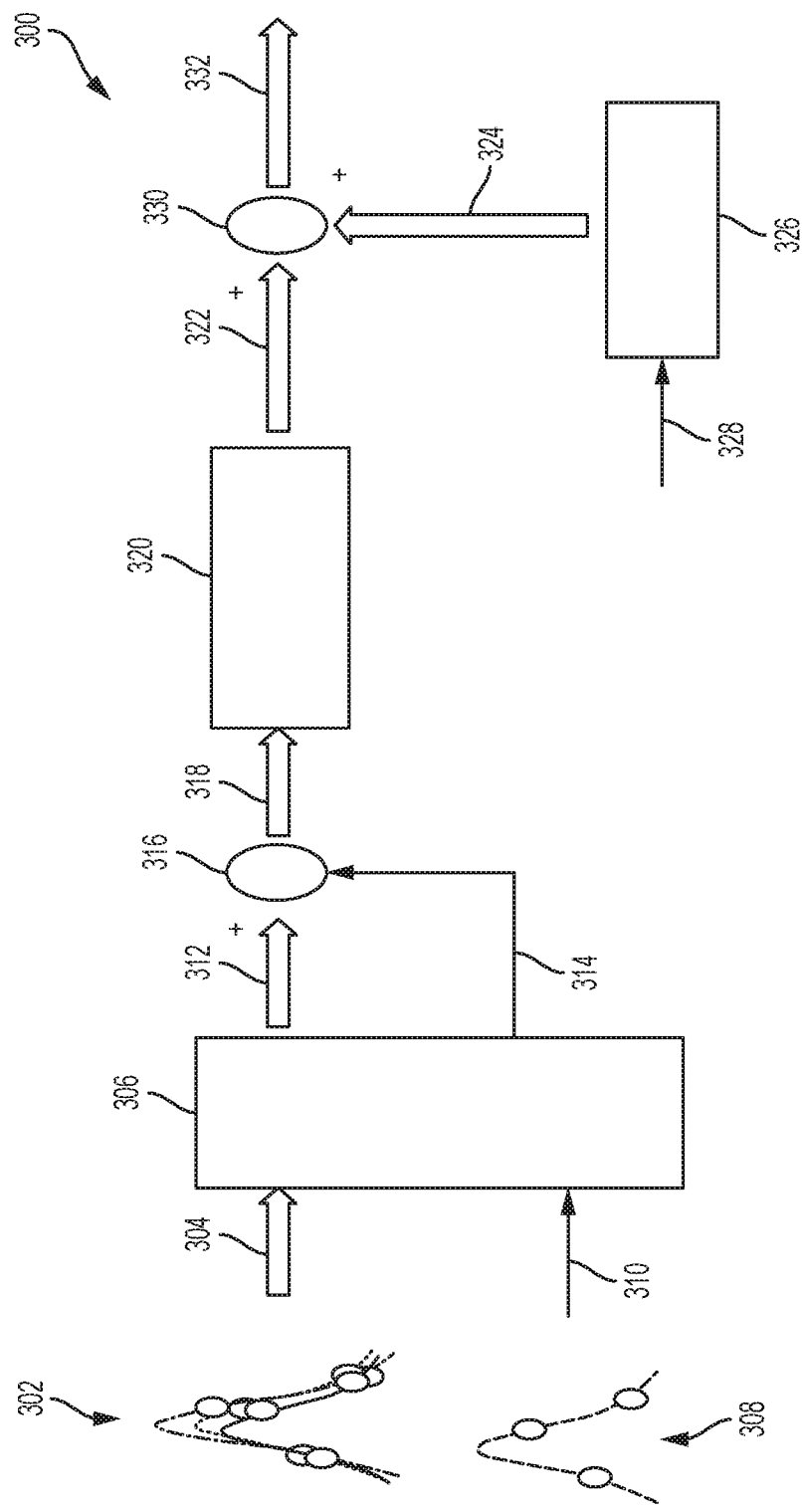
FIG. 3 is a schematic illustration of an engine combustion control system 300 in accordance with an exemplary embodiment of the present disclosure.

FIG. 3 is a schematic illustration of an engine combustion control system 300 in accordance with an exemplary embodiment of the present disclosure. The system 300 starts by sampling individual cylinder pressure traces at 302 and providing those samples 304 to a first modal coefficient module 306. Simultaneously, samples of a desired cylinder pressure trace are obtained at 308 and those samples 310 are also provided to the first modal coefficient module 306. The first modal coefficient module 306 outputs the first modal coefficient for each cylinder at 312 and outputs the first modal coefficient for the desired cylinder pressure trace at 314. The difference 318 between the first modal coefficients 312 and 314 is determined at 316. The difference 318 (or coefficient error) is provided to a balance control module 320 which determines the relationship between the difference in first mode coefficient(s) 318 and a spark timing for each cylinder and outputs a spark timing adjustment signal 322. In particular, the balance control module determines a spark timing adjustment signal 322 for each cylinder which will result in the cylinder pressure traces of each cylinder matching the desired pressure cylinder trace based on the first modal coefficients, which also provides the benefit of balancing the cylinders in a multi-cylinder engine. Simultaneously, a nominal spark timing signal 324 is generated by a spark timing module 326 based upon engine operating conditions 328, such as, for example, engine load, engine speed, and the like without limitation. The spark timing adjustment signal 322 and the spark timing signal 324 are summed at 330 to provide a spark timing signal 332 for each cylinder in the engine.

Further, with the use of the present disclosure, the sampling rate of the combustion characteristic signal may be significantly reduced in comparison to conventional methods of combustion control and/or engine balancing methods and control systems. Conventional methods and systems may control an aspect of combustion based upon a signal that is sampled at a high rate for the purposes of calculating CA50 for each cylinder. For example, some systems and methods may sample a cylinder pressure signal at each of 360 degrees within a crankshaft revolution. The bandwidth and processing power that is required to handle this volume of sampled data requires a relatively expensive system. In contrast, the sampling rate that is required by the methods and systems of the present disclosure is greatly reduced. In an exemplary embodiment, the methods and systems of the present disclosure may sample a combustion characteristic signal about three times per combustion event. The inventors discovered that combustion can be well controlled with a sampling rate that is as low as only three samples per combustion event. While the combustion characteristic signal may be sampled more frequently, only marginal improvements may be realized from a higher sampling rate.

The number of samples that are acquired per cycle determine the number of mode coefficients that are provided by a principal component analysis. The inventors determined that the preferred minimum sampling rate may be as low as only three or four samples per cycle.

Additionally, the inventors discovered that with the methods and systems of the present disclosure the computational workload varies in accordance with the sampling rate and not the number of cylinders. Therefore, even greater relative improvements in computational workload is achievable with engines have more cylinders in comparison to previous methods and systems.

Referring now to FIGS. 4A and 4B, the effectiveness of an exemplary embodiment of the present disclosure on a four cylinder internal combustion engine is clearly illustrated. The horizontal axes 400 of both graphs of FIGS. 4A and 4B represent the number of combustion cycles. The vertical axis 402 of FIG. 4A represents the CA50 and the vertical axis 404 of FIG. 4B represents the values for the first modal coefficients for each of the four cylinders. The dashed line in both of FIGS. 4A and 4B represent the desired CA50 (406 in FIG. 4A) and the first modal coefficient of the desired pressure trace (408 in FIG. 4B). The vertical dashed line 410 extending across both of FIGS. 4A and 4B represents an engine cycle at which the method and system of the present disclosure is applied to the engine. Prior to cycle 410, the CA50s (FIG. 4A) for each of the cylinders clearly vary by a substantial amount and none of those CA50s align well with the desired CA50 406. After cycle 410, the methods and systems of the present disclosure clearly cause the combustion within each to have CA50s which closely follow the desired CA50 406. This happens as a result of the system and method controlling the combustion within each cylinder such that the first mode coefficients for each cylinder closely match the first mode coefficient of the desired pressure trace 408. Additionally, FIGS. 4A and 4B illustrate the ability for the method and system of the present disclosure to quickly react and maintain desired combustion characteristics in response to a step change represented in region 412 of both FIGS.

Figure 5:
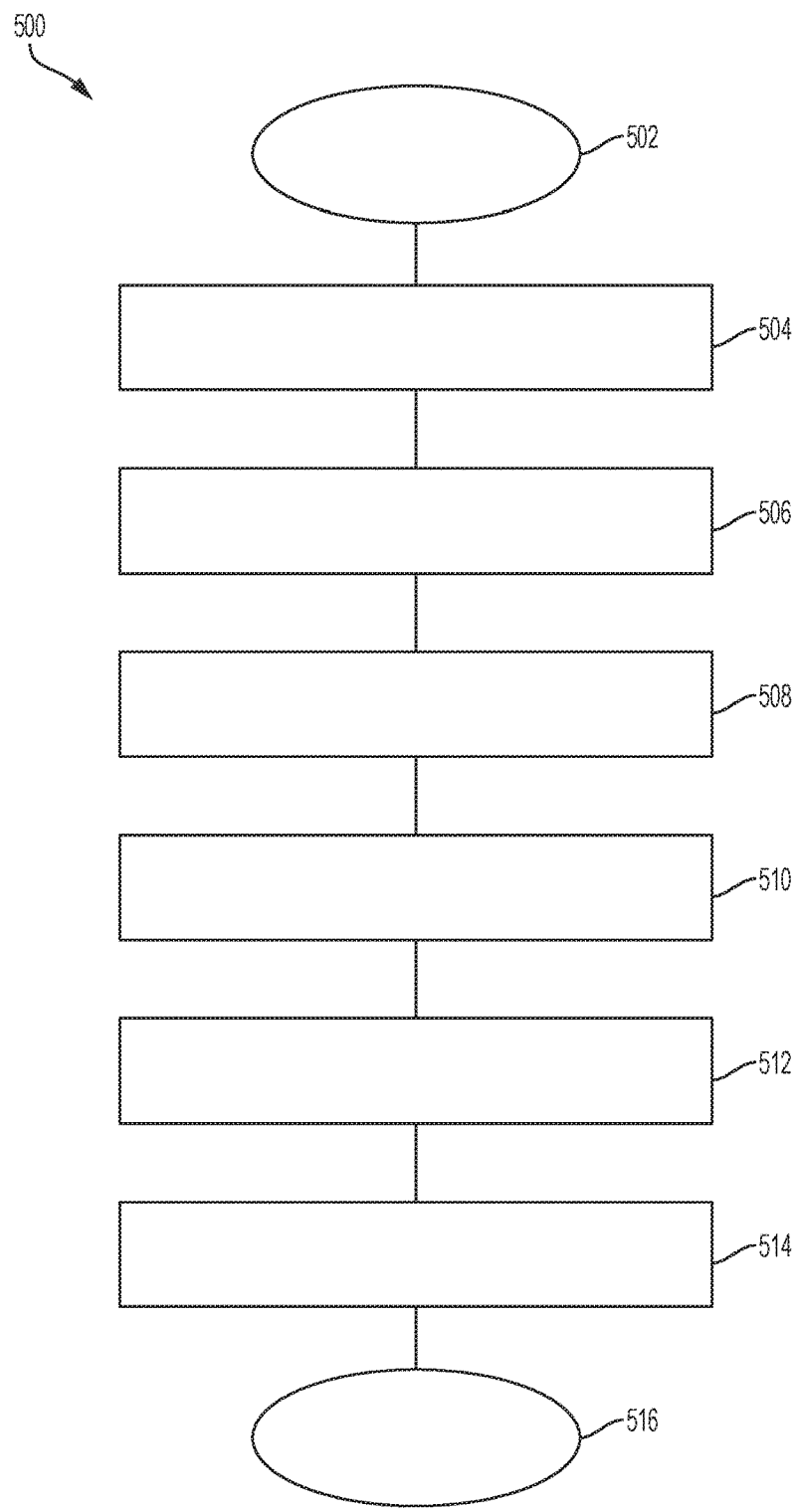
FIG. 5 illustrates a flowchart 500 of a method in accordance with an exemplary embodiment of the present disclosure.

FIG. 5 illustrates a flowchart 500 of a method in accordance with an exemplary embodiment of the present disclosure. The method starts at step 502 and continues to step 504 where a characteristic of combustion in a cylinder of an engine is sensed. The method then continues to step 506 where a predetermined combustion characteristic trace is selected based on engine operating condition and the method continues to step 508. In step 508, a combustion characteristic signal is generated based upon the sensed characteristic and the method continues to step 510. In step 510, the method performs a principal component analysis on the combustion characteristic signal and the predetermined combustion characteristic trace to determine first mode coefficients for the combustion characteristic signal and the predetermined combustion characteristic trace. The method then continues to step 512 where the method determines a difference between the first mode coefficient of the combustion characteristic signal and the first mode coefficient of the predetermined combustion characteristic trace and the method then continues to step 514. In step 514, the method controls the internal combustion engine based upon the difference. The method then ends in step 516.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling an internal combustion engine, the method comprising:
   sensing a characteristic of combustion in a cylinder of the engine;
   generating a combustion characteristic signal from the sensed characteristic;
   performing a principal component analysis on the combustion characteristic signal and a predetermined combustion characteristic trace to determine first mode coefficients for the combustion characteristic signal and the predetermined combustion characteristic trace;
   determining a difference between the first mode coefficient of the combustion characteristic signal and the first mode coefficient of the predetermined combustion characteristic trace; and
   controlling the internal combustion engine based upon the difference.

2. The method of claim 1, wherein the combustion characteristic signal comprises a cylinder pressure signal from a pressure sensor of the cylinder.

3. The method of claim 1, wherein the predetermined combustion characteristic trace comprises a predetermined cylinder pressure trace.

4. The method of claim 1, wherein the combustion characteristic signal comprises a gap resistance signal from a spark plug of the cylinder.

5. The method of claim 1, wherein the predetermined combustion characteristic trace comprises a predetermined gap resistance trace.

6. The method of claim 1, wherein the predetermined combustion characteristic trace corresponds to a predetermined CA50 for the cylinder.

7. The method of claim 1, wherein controlling the internal combustion engine comprises adjusting a spark timing signal based upon the difference.

8. The method of claim 1, wherein controlling the internal combustion engine comprises adjusting a fuel injection timing signal based upon the difference.

9. A method for balancing multiple cylinders in an internal combustion engine, the method comprising:
   sensing a characteristic of combustion for each cylinder of the engine;
   generating a combustion characteristic signal from the sensed characteristic for each cylinder;
   performing a principal component analysis on the combustion characteristic signal of each cylinder and a predetermined combustion characteristic trace to determine first mode coefficients for the combustion characteristic signal for each cylinder and the predetermined combustion characteristic trace;
   determining a difference between the first mode coefficient of the combustion characteristic signal for each cylinder and the first mode coefficient of the predetermined combustion characteristic trace; and controlling the combustion in each cylinder based upon the differences.

10. The method of claim 9, wherein the combustion characteristic signal for each cylinder comprises a cylinder pressure signal from a pressure sensor for at least one of the cylinders.

11. The method of claim 9, wherein the predetermined combustion characteristic trace comprises a predetermined cylinder pressure trace.

12. The method of claim 9, wherein the combustion characteristic signal comprises a gap resistance signal from a spark plug of at least one of the cylinders.

13. The method of claim 9, wherein the predetermined combustion characteristic trace comprises a predetermined gap resistance trace.

14. The method of claim 9, wherein the predetermined combustion characteristic trace corresponds to a predetermined CA50 for at least one of the cylinders.

15. The method of claim 9, wherein controlling the internal combustion engine comprises adjusting a spark timing signal based upon the difference.

16. The method of claim 9, wherein controlling the internal combustion engine comprises adjusting a fuel injection timing signal based upon the difference.

17. A control system for an internal combustion engine, the system comprising:

a combustion sensor that samples a combustion characteristic within a cylinder of an engine in the vehicle propulsion system and that outputs a combustion characteristic trace signal;

a desired combustion characteristic trace signal storage that stores a desired combustion characteristic signal;

a controller that is configured to:

perform a principal component analysis to determine first mode coefficients of the combustion characteristic trace signal and the desired combustion characteristic signal;

compare the first mode components; and generate a control signal based upon the results of the comparison; and an engine that is responsive to the control signal.

18. The system of claim 17, wherein the combustion sensor comprises a pressure sensor that outputs a cylinder pressure signal.

19. The system of claim 17, wherein the control signal comprises a spark timing signal.

20. The system of claim 17, wherein the control signal comprises a fuel injection timing signal.

\* \* \* \* \*